J. E. LEAMANN.

BREAD PAN.

APPLICATION FILED AUG. 15, 1911.

Reissued Jan. 21, 1913. 13,516.

Witnesses
J. Adolph Bishop
L. Hoskinson.

Inventor
James E. Leamann,
by Foster, Freeman, Watson & Coit.
Attorneys

UNITED STATES PATENT OFFICE.

JAMES E. LEAMANN, OF BALTIMORE, MARYLAND, ASSIGNOR TO THE AUGUST MAAG COMPANY OF BALTIMORE CITY, OF BALTIMORE, MARYLAND, A CORPORATION OF MARYLAND.

BREAD-PAN.

13,516. Specification of Reissued Letters Patent. Reissued Jan. 21, 1913.

Original No. 917,622, dated April 6, 1909, Serial No. 463,113. Application for reissue filed August 15, 1911. Serial No. 644,260.

*To all whom it may concern:*

Be it known that I, JAMES E. LEAMANN, a citizen of the United States, residing at Baltimore, in the State of Maryland, have invented certain new and useful Improvements in Bread-Pans, of which the following is a specification.

In baking upon a large scale it is desirable to handle a number of loaves at a time while at the same time keeping the loaves distinct and separate. This is conveniently accomplished by connecting bread-pans for single loaves in series so that a number of single-loaf pans may be handled as a unit. It is found that when pans are so connected the end-pans of the series are subjected to much more wear and tear than the intermediate pans, as the tools used for pushing the pans into the oven and pulling them out operate almost entirely upon the end-pans and particularly upon the outer sides of these pans.

The objects of my invention are to provide means for connecting a series of individual pans so that they may be handled as a unit and to properly reinforce the end-pans so that the lives of the end-pans may be substantially the same as the lives of the intermediate pans, which results in maximum economy in the use of the pans.

The invention also comprises specific improvements in the manner of reinforcing the end-pans.

Figure 1:
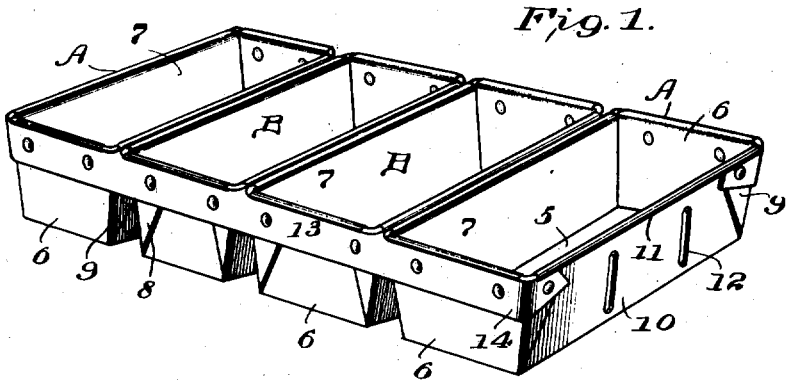
Figure 2:
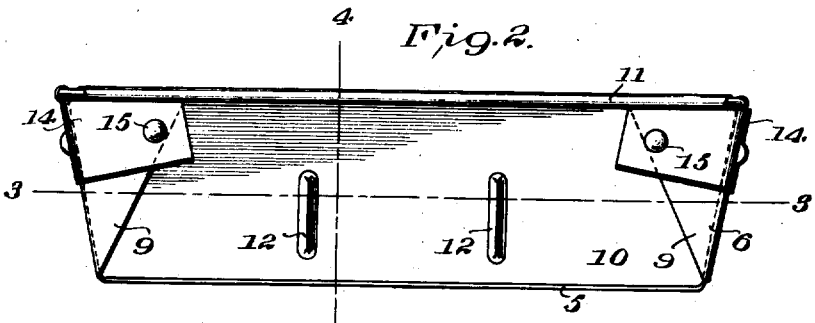
Figure 3:
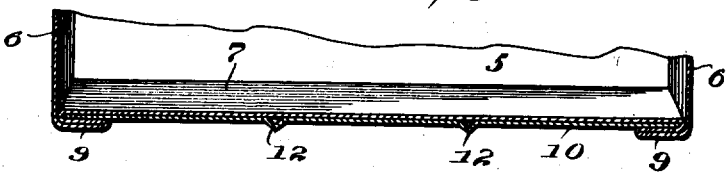
Figure 4:
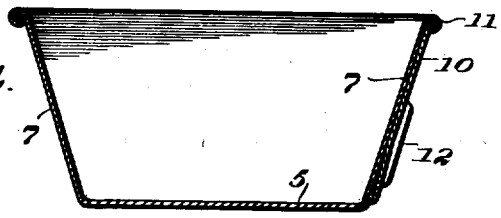

The invention is shown in the accompanying drawing in which:

Figure 1 is a view of a series of individual bread-pans connected together and having my improvements. Fig. 2 is a side view of the end-pan of the series. Fig. 3 is a longitudinal section of the reinforced side of a pan taken on the line 3—3 of Fig. 2. Fig. 4 is a cross section of the improved bread-pan.

The drawing shows rectangular bread-pans each for one loaf of bread; these pans are commonly made of sheet metal shaped to form a bottom, 5, two end walls 6, and two side walls, 7. The corners of the pans are formed by V-shaped folds 8, which ordinarily have position on the ends 6, of the pan. The bottom and all four walls of the ordinary pan only have one thickness of sheet-metal.

The pans are provided with turned edges, preferably wired, as shown, and each pan is complete in itself.

In Fig. 1 which shows four pans connected together, the two pans B, B, which are intermediate of the end-pans A are made in the ordinary manner just described. The two end-pans, however, have each one side wall 7, single thick and the opposite side wall double thick.

Referring now to the end-pan shown in Figs. 2, 3 and 4, it will be seen that one side wall consists of a single thickness 7, and the opposite side wall consists of two thicknesses 7, 10. The two thicknesses are produced by adding an outer plate 10 and securing it in position. In this reinforced pan A the V-shaped fold 9, at each corner is preferably folded over and laps upon the ends of the reinforcing plate 10; these folds produce four thicknesses of metal at the side adjacent the corner as seen in Fig. 3. As the pans have inclined or flaring walls, and as the two end edges of the said outer plate 10 are inclined to correspond with the flare of the end of the pan, it will be seen that said V-shaped folds 9 serve to hold the plate 10 in its proper position especially as the top edges of the walls are coiled over outward, the coil 11 of the side wall being in contact with the upper edge of the said plate 10. For further security in holding the reinforcing plate 10, a rivet 15 may be employed; this rivet passing through all four thicknesses.

In order to still further increase the stiffness of the outermost side wall of each end-pan, the outer plate 10 is provided with several vertically extending outwardly projecting swages or protrusions 12. These are formed before the plate is attached to the pan. The several pans are secured together by bars 13 extending along the ends of all the pans of the series below the turned edges thereof, the ends 14 of said bars being bent at right angles, and said bent ends projecting around the corners and overlapping the double-thick sides. Rivets 15 are passed through said bent ends 14 and also through the four thicknesses of sheet-metal where the fold 9 is located. This combination and arrangement give the desired strength to the series of pans and reinforce the side of each end-pan.

While I have shown the rivets 15 as passing through the reinforcing plate 10 it will be noted that these plates are securely held in position and cannot become detached, regardless of the rivets. This results from the fact that the reinforcing plates have flaring ends corresponding to the angle of the sides of a pan, which prevents the plates from dropping down when once secured by the V-shaped folds 9. As the plates are prevented from moving upward by the wired flanges 11 they are secured from movement in any direction, regardless of the rivets 15. I preferably pass rivets through the reinforcing plate to prevent any looseness of the plate, but it will be seen that these rivets may in some instances be omitted without danger that the plates may become detached.

Having thus described my invention what I claim and desire to secure by Letters Patent is:

1. The combination of a series of rectangular bread-pans, the two end-pans of the series each having its outermost side wall composed of two thicknesses, the inner thickness having an interior surface which is continuously straight from end to end and the outer thickness provided with exteriorly protruding and vertically extending swage marks, and the innermost side wall of the end-pan composed of one thickness only of sheet-metal, and the one or more pans of the series which are intermediate of said two end-pans having walls of one thickness only, and means extending along all the pans of the series and securing them together.

2. The combination of a series of sheet-metal bread-pans arranged side by side, the two end-pans A of the series each having one side wall of one thickness only and the opposite side wall of two thicknesses secured together said two thicknesses constituting the end or outer side of the series, and the pans B of the series which are intermediate of said end-pans having all their walls of one thickness only, and metal bars extending along each end of all the pans of the series and the ends of said bars bent and projecting around and overlapping onto the said two thicknesses of said end-pans and secured thereto.

3. In combination, a series of rectangular bread-pans, the intermediate pans of the series having V-shaped folds on their ends and the end pans of the series having V-shaped folds on their sides, a reinforcing plate on the outer side of each end-pan, and two metal bars extending along the series of pans and secured to the ends of the pans, whereby the entire series may be handled as a unit.

4. A new article of manufacture consisting in a single row of rectangular bread pans arranged side by side, each complete in itself and having a turned edge, two bars 13 extending along and secured to the ends of the pans below the turned edges thereof, whereby the ends of the pans are protected and the pans connected to form a unitary structure, and reinforcing plates on the outer sides of the end pans extending substantially the full height thereof, whereby the life of the end pans may be prolonged to substantially equal the life of the intermediate pan or pans, the said reinforcing plates being securely connected to the end pans.

5. In combination, a series of oblong bread pans, arranged side by side, each complete in itself and having a turned edge, two bars 13 extending along the ends of the pans constituting the series, and below the turned edges thereof, means securing said bars to the ends of the pans whereby the series of pans may be handled as a unit and the ends of the pans are protected, reinforcing plates secured to the outer sides of the end pans and extending substantially the full height thereof, and having their end portions arranged under the ends of the bars 13, and means common to the ends of the bars and the ends of the plates for securing these parts to the pans, said reinforcing plates prolonging the life of the end pans to equal substantially the life of the intermediate pan or pans.

6. In combination, a series of rectangular bread-pans, bars secured to the ends of the pans whereby the series may be handled as a unit, and reinforcing plates on the outer sides of the end-pans, the end pans having V-shaped folds on their outer sides and the ends of the reinforcing plates being inclosed by said folds.

7. In combination, a series of rectangular bread-pans, bars secured to the ends of the pans whereby the series may be handled as a unit, and reinforcing plates on the outer sides of the end-pans, all of the pans having outwardly flaring sides and ends, the end-pans having V-shaped folds on their outer sides, and reinforcing plates provided with outwardy flaring ends secured within said folds.

In testimony whereof I have affixed my signature in the presence of two witnesses.

JAMES E. LEAMANN.

Witnesses:

B. D. BUCK,

GEORGE LOCHNER.